Feb. 24, 1925.

H. JONES

CAMERA

Filed June 7, 1923

1,527,415

INVENTOR
Horace Jones
By Jas R Snyder
Attorney

Patented Feb. 24, 1925.

1,527,415

UNITED STATES PATENT OFFICE.

HORACE JONES, OF PITTSBURGH, PENNSYLVANIA, ASSIGNOR OF ONE-HALF TO WILLIAM B. JONES, OF PITTSBURGH, PENNSYLVANIA.

CAMERA.

Application filed June 7, 1923. Serial No. 643,855.

*To all whom it may concern:*

Be it known that I, HORACE JONES, a citizen of the United States, residing at Pittsburgh, in the county of Allegheny and State of Pennsylvania, have invented certain new and useful Improvements in Cameras, of which the following is a specification.

This invention relates to a developing and transporting case for cameras and important objects of the invention are to provide a case of the type stated, in a manner as hereinafter set forth, which serves as a suitable housing structure for the camera; which embodies novel means for developing and finishing a photograph immediately after same is taken; and which provides an attractive container for transporting the camera.

Further objects of this invention are to provide a device of the character described, which is simple in its construction and arrangement, strong, durable and efficient in its use, and comparatively inexpensive to manufacture.

To the accomplishment of these and such other objects as may hereinafter appear the invention consists of the novel construction, combination and arrangement of parts herein specifically described and illustrated in the accompanying drawing, wherein is shown an embodiment of the invention, but it is to be understood that changes, variations, and modifications can be resorted to which come within the scope of the claims hereunto appended.

In the drawing forming a portion of this specification and wherein like numerals of reference designate corresponding parts throughout the several views:—

Figure 1:
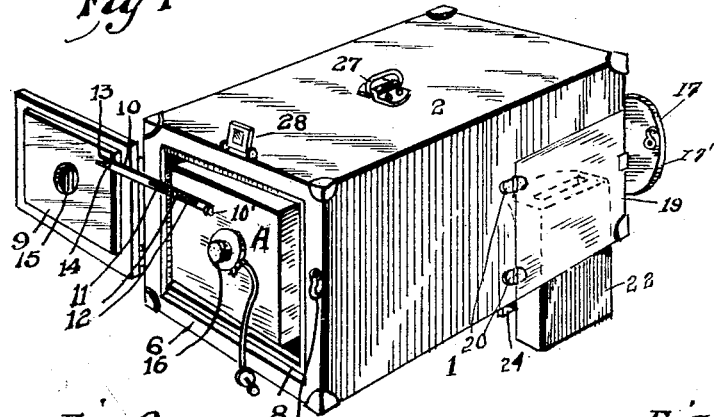
Figure 1 is a perspective view of a developing and transporting camera casing in accordance with my invention.

Referring in detail to the drawing there is shown in Figure 1 a camera apparatus in accordance with my invention and primarily designed for taking, developing and finishing photographs without the use of any equipment except that embodied in the camera apparatus itself.

My improved camera apparatus comprises a casing 1 preferably rectangular in contour, and consisting of the top 2, bottom 3, respective side walls 4 and 5, the front end wall 6, and the rear end wall 7.

The front end wall 6 is formed with a large square opening 8 which latter is provided with door 9 hinged at its side to the front wall 6. The camera A is shiftably supported in the forward portion of the casing 1 in any suitable manner to permit of its forward portion being projected through the opening 8 when adjusted for use, and for retracting the same when not in use. The door 9 is locked in closed position by the latching member 9'.

When the camera A is projected for use as illustrated in Figure 1, of the drawing, it is secured in the adjusted position by means of the horizontally disposed supporting bar 10. The latter is formed with an elongated slot 11 and is attached to the front face of the camera A by a pair of spaced headed pins 12 which are so engaged in the elongated slot 11 as to maintain the supporting bar 10 in the horizontal position and allow the supporting bar 10 to be shifted horizontally on the pins 12. The supporting bar 10 is formed with a forked outer end 13 which is adapted to engage a headed pin 14 fixed on the inner face of the door 9, when the latter is in the open position. The elongated slot 11 is of sufficient length to allow the bar 10 to be horizontally shifted across the front face of the camera A to permit of its entering the opening 8, when the camera A is retracted into the casing 1 to the inoperative position. The inner end of the supporting bar 10 is bent forwardly to provide a projection 10' to facilitate the manipulation of the bar 10 in the manner and for the purpose above stated.

The door 9 is provided on its inner face with a centrally disposed recess or pocket 15 which overlaps the camera lens 16 when the door 9 is in the closed position.

The rear wall 7 of the camera casing 1 is formed with a circular opening provided with a circular door 17 which latter is hinged to the rear wall 7 and locked in the closed position by means of the latch member 17'. The rear wall opening is provided to permit of the insertion of the arm of the photographer when placing a plate in the camera A or when removing same therefrom. As it is essential that light be excluded from the plates during such operations the camera is equipped with a textile darkening sleeve 18 of the usual construction through which the photographer operates.

A side door 19 is provided in the rear lower end of the casing side wall 4 and is hinged to the latter, as indicated at 20, and is locked in the closed position by the latch member 19'. The inner face of the door 19 is provided with a supporting bracket 21 which is fixed to the lower end thereof. A developing tank 22, provided with a suitable hinged cover 23, is carried in the bracket 21, and may be shifted vertically therein for the purpose to be described.

Figure 2:
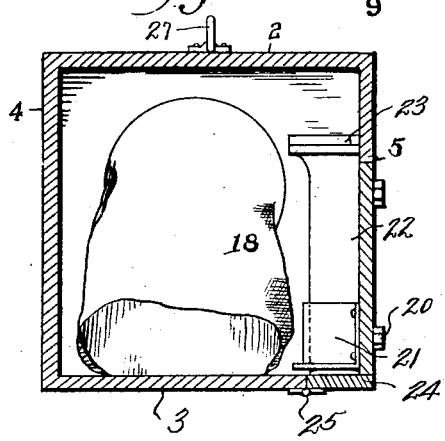
Figure 2 is a transverse sectional view thereof.
Figure 3:
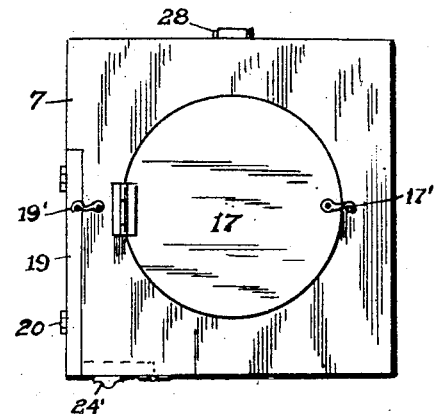
Figure 3 is a rear end view of the casing.
Figure 4:
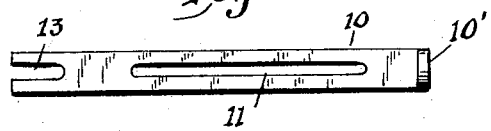
Figure 4 is an enlarged detail front view of the camera support.

A small bottom door 24 is provided in the casing bottom 3 and is hinged to the latter, as indicated at 25. The door 24 is positioned directly under the tank 22 and when in the closed position supports the tank 22 in the elevated position, as clearly shown in Figure 2, of the drawing. The door 24 is locked in the closed position by means of the latch number 24' and when the door 24 is opened the developing tank 22, supported thereby will shift by gravity in the bracket 21 to the lower position for use, as shown in Figure 1, of the drawing. When in such lowered position the developing tank 22 is only supported by the bracket 21.

The developing tank 22 is of greater length than the side door 19 and in consequence the latter cannot be opened until the bottom door 24 is first opened to allow the developing tank to shift to the lower position. Such arrangement is provided to prevent the inadvertent opening of the side door 19 before the plates are developed, as the tank 22 must be in the lowered position to accomplish such development.

The developing tank 22 is provided for storing required developing solution. The immersion and development of the plates in the solution tank 22 may be readily accomplished by the operator by using the rear portion of the casing 1 as a dark room and by using the textile sleeve 18 to cover the opening in the rear wall 7 to exclude the light.

The doors 9, 17, 19 and 24 are preferably constructed to provide an accurate shiplapped engagement with respective door opening margins to assure the exclusion of light from the casing 1.

The top 2 of the casing 1 is provided with centrally disposed carrying handle member 27, and with a finder lens 28, which latter is pivotally supported centrally of the forward end thereof.

What I claim is:—

1. A device for the purpose set forth comprising a casing provided with a front door, a rear door, a side door, a tank shiftably carried by said side door, and bottom door for supporting said tank when in the elevated position.

2. A device for the purpose set forth comprising a casing adapted for shiftably supporting a camera to permit of its projection or retraction in said casing, a front door, a rear door, a bottom door, a side door, a tank shiftably carried by said side door, and means for supporting said camera in the projected position.

3. A device for the purpose set forth comprising a casing adapted for shiftably supporting a camera to permit of its projection or retraction in said casing, a front door, a rear door, a bottom door, a side door, a tank shiftably carried by said side door, and means slidably mounted on said camera for supporting said camera in the projected position.

In testimony whereof I affix my signature.

HORACE JONES.